DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 3, 1974

926 O.G. 11

T926,011

INK RESERVOIR FOR WRITING INSTRUMENTS

Daniel J. Kun, Los Angeles, and Lotfi Hafez Lotfallah, Hollywood, Calif., assignors to The Gillette Company, Santa Monica, Calif.

Filed Feb. 11, 1974, Ser. No. 441,123
Int. Cl. B43k *5/14, 5/20*
U.S. Cl. 401—132
1 Sheet Drawing. 6 Pages Specification

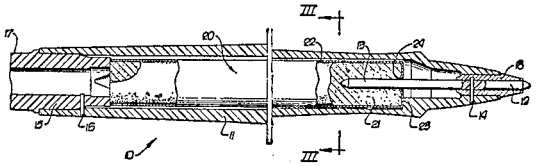

A reservoir for writing instruments employing liquid inks is disclosed wherein the reservoir has a puncturable seal at the end nearest the point of the writing instrument, such puncturable seal preventing leakage of ink contained in the reservoir. The reservoir, in general, consists of a bundle of fibers which can be made of thermoplastic material, said bundle having an outer wrapping of a film of plastic which can be cellophane or, in the alternative, the thermoplastic fibers of the reservoir can be sintered to form said outer layer or film to prevent leakage of the ink to the outside. The end nearest the point is sealed to prevent ink leakage with a puncturable seal (i.e. a seal that the point can penetrate), the seal being plastic, wax or, preferably, the seal is formed by applying heat to the ends of the fibers of the reservoir in order to sinter the same. After the fibers are sealed at the end thereof, the writing nib is inserted through the puncturable seal and into the fibers per se in order to permit flow of ink from the reservoir to the nib, the seal at the end conforming to the shape of the point to maintain the seal and prevent leakage of ink.

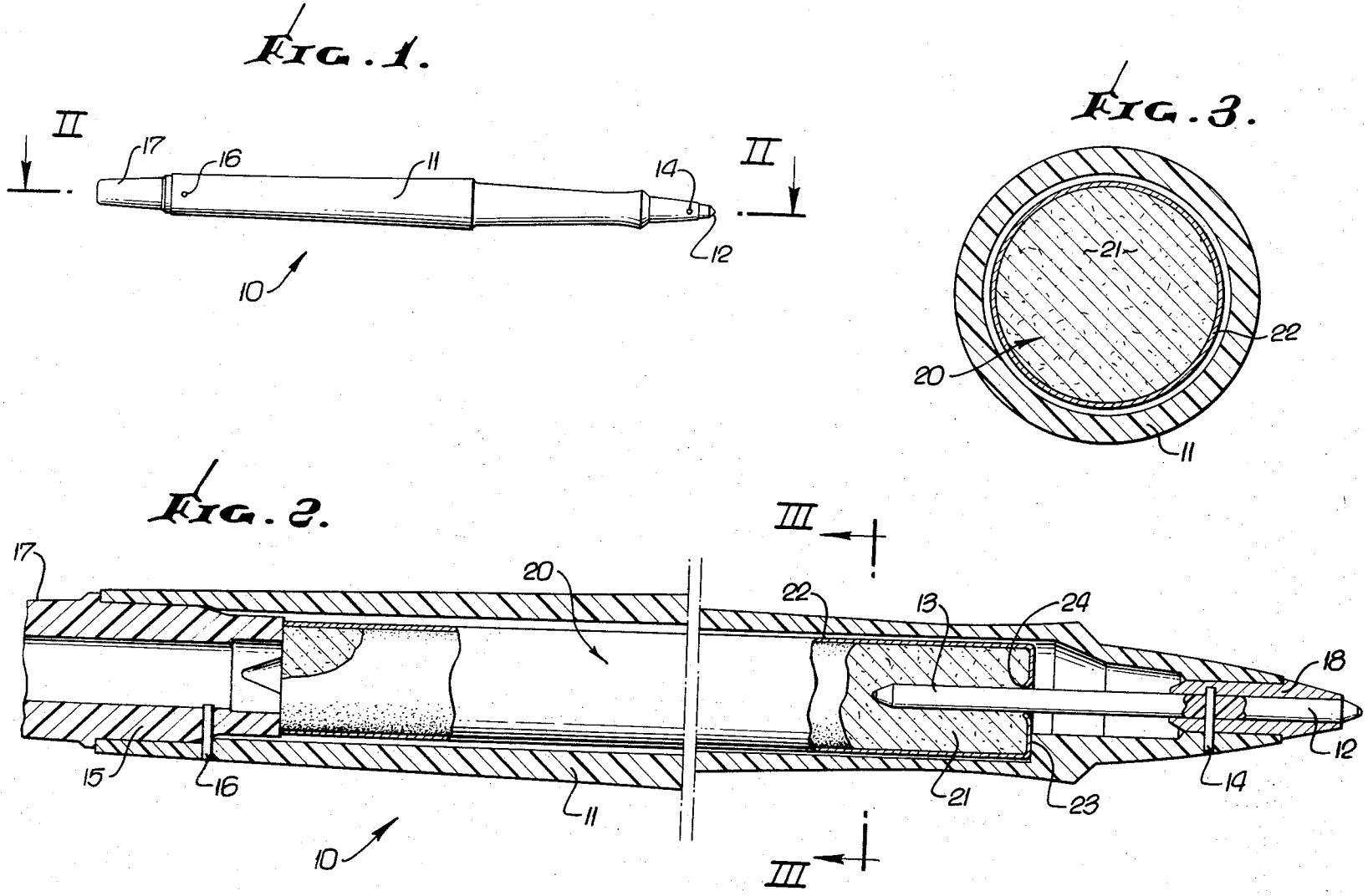

Sept. 3, 1974
D. J. KUN ET AL
T926,011
INK RESERVOIR FOR WRITING INSTRUMENTS
Filed Feb. 11, 1974